Dec. 24, 1963 E. W. SUTTON ETAL 3,115,602
CONTINUOUS MUD RESISTIVITY MEASURING DEVICE WITH ELECTRICITY CONDUCTIVE CURRENT CONFINING MEANS
Filed Feb. 1, 1960 2 Sheets-Sheet 1

INVENTORS.
EARL W. SUTTON
JAMES C. ALBRIGHT
BY William J. Miller
ATTORNEY

"LATERAL" ARRANGEMENT

"LONG" NORMAL ARRANGEMENT

"SHORT" NORMAL ARRANGEMENT

*INVENTORS.*
EARL W. SUTTON
JAMES C. ALBRIGHT
*BY* William J. Miller
*ATTORNEY*

United States Patent Office 3,115,602

Patented Dec. 24, 1963

3,115,602

CONTINUOUS MUD RESISTIVITY MEASURING DEVICE WITH ELECTRICITY CONDUCTIVE CURRENT CONFINING MEANS

Earl W. Sutton and James C. Albright, Ponca City, Okla., assignors to Continental Oil Company, Ponca City, Okla., a corporation of Delaware Filed Feb. 1, 1960, Ser. No. 5,839

3 Claims. (Cl. 324—10)

This invention deals generally with the electric logging of subsurface well-bores, and in particular with a device for measuring the electrical resistivity of the fluid within a well-bore.

The correct evaluation of the results from the electric logging of subsurface well-bores has depended, to a large extent, upon the accurate determination of the mud resistivity at the various depths and temperatures within the borehole. Mud resistivity, for the most part, will vary at different levels within the borehole by a change in the composition, or by a change in the temperature of the mud. In the past, the resistivity of the mud at various levels has been determined by several methods.

One method measured the resistivity of a sample of the mud at the surface of the borehole, and calculated the change in resistivity as the mud increases in temperature with depth within the borehole. This method leads to several possibilities for inaccuracy. First, the measurement of the sample at the surface of the borehole may be inaccurate since the sample may not be a true representation of the mud within the borehole. Second, the variation in temperature at the depth of interest may not be easily determined, therefore, resistivity based on this measurement may be inaccurate.

Another method for measuring the resistivity of the mud within a borehole is accomplished by lowering a pad-type sonde down the borehole in a collapsed state. As the pad-type sonde is lowered, continuous resistivity measurements are made and correlated with the depth within the borehole. This system, likewise, has questionable accuracy since the measurement is accurate only when the pad-type sonde is sufficiently far from the walls of the bore hole that their effect will be negligible on the mud resistivity measurement. Any washed out or enlarged area of the borehole will give an accurate reading of the mud resistivity, providing the measuring pad is sufficiently centered within the enlarged section. Enlarged sections may be located with the help of a caliper, which is obtained when the sonde is pulled from the well with the pads in their operating position. This system, of course, has several obvious drawbacks. It may be difficult to locate appropriately washed out sections within the formation being logged, especially where the accurate mud resistivity must be measured. Also, there is generally no certainty that the measuring pad is sufficiently far from the wall of the hole even in the enlarged positions of the hole so that an accurate measurement of mud resistivity may be determined. This condition would be especially difficult to realize for a borehole which is drilled at an angle from vertical.

This invention features a resistivity measuring device adapted to measure the resistivity of a fluid within a borehole said device comprising, an insulated member means supporting said insulated member in a plane perpendicular to the axis of said well-bore, current confining means extending below said insulated portion, electrode means inserted through said insulated member.

A primary object of this invention, therefore, is to make possible a method of continuously measuring the mud resistivity in the well-bore at down hole temperatures.

A further object of this invention is to provide a device for measuring the variations in borehole resistivity either as the sonde is being lowered or as the sonde is being raised.

A still further object of the invention is to provide a resistivity measuring sonde that will indicate accurate mud resistivity regardless of the position of the sonde within the borehole.

Further objects, features, and advantages of the invention will become apparent from the following description and claims when read in view of the accompanying drawings, in which:

Similar numbers will be used throughout all figures where common structural elements are shown.

Figure 1:
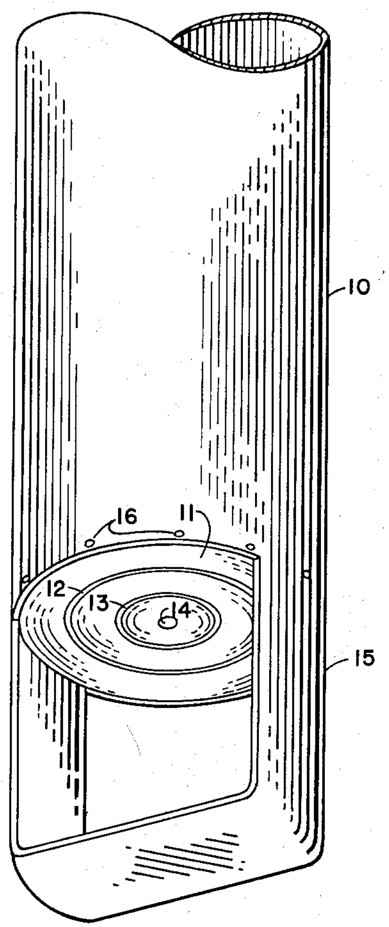
FIGURE 1 is a perspective drawing of the perfect embodiment of this invention.

Referring to FIGURE 1, a casing or shell 10 is shown which may be a separate sonde or may be the lower portion of another sonde. Covering the open end of shell 10 is a disc 11 which is made of any suitable insulating material, for example, polystyrene. Insulated disc 11 is rigidly held within casing 10 by any suitable holding device, such as rivets 16. A substantially U-shaped electrode protection device and current confining means 15 extends below shell 10. Electrodes 12, 13, and 14 extend through insulating plate 11. Electrodes 12 and 13 are formed on the exposed side of disc 11 by electroplating or other suitable methods. However, in place of the electroplating, conductive rings, rivets, or other suitable electrodes could be used. Electrode 14, likewise, could be a conductive disc or rivet. Electrodes 12, 13, and 14 have a conductive portion such as a rivet or other suitable means in conductible relation with the electrodes and extending through disc 11 so that wires or other suitable conductors (not shown) may be attached thereto.

In actual use, the sonde is lowered into a well-bore by any suitable means, such as a cable. The construction of the sonde confines the insulated disc 11 containing the electrodes 12, 13, and 14 to a plane substantailly perpendicular with the axis of the well-bore. In this confined position, the wall of the well-bore has no effect on the operation of the sonde. Current confining means 15 substantially confines the current to the area immediately around the electrodes. This further insures that the well-bore will have little effect upon the resistance measurements obtained by the sonde. Current confining means 15, likewise, acts as a protective guard, thereby protecting the electrodes from harm during normal use. The design, however, readily permits the well-bore fluids to readily pass by the electrodes during the passage of the sonde down or up the well-bore. The current confining means is not necessary if a small percentage error is permissible, for example, in one model tested, an error of 2–3% was noted when the current confining electrode was eliminated.

Figure 2:
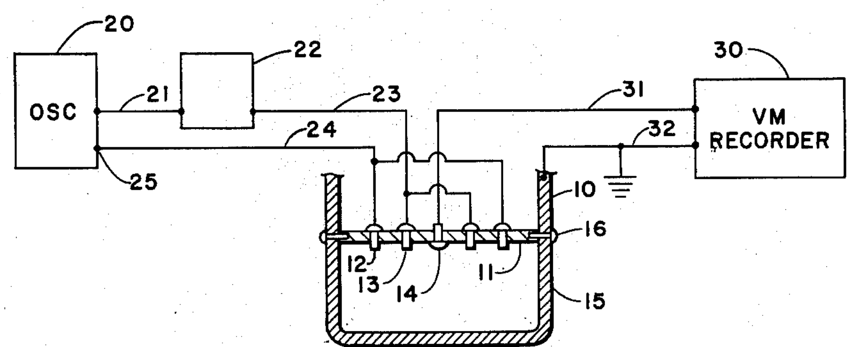
FIGURE 2 is a cross-sectional view which shows a "lateral" arrangement for electrically connecting the embodiment in FIGURE 1.
Figure 3:
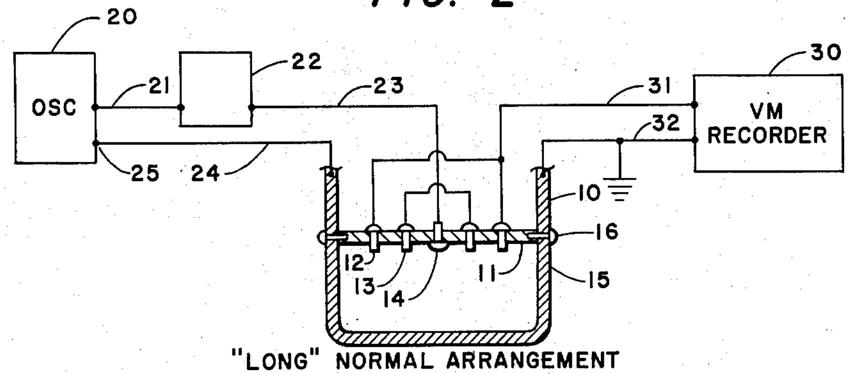
FIGURE 3 is a cross-sectional view which shows a method for connecting the electrodes in a "long" normal arrangement.
Figure 4:
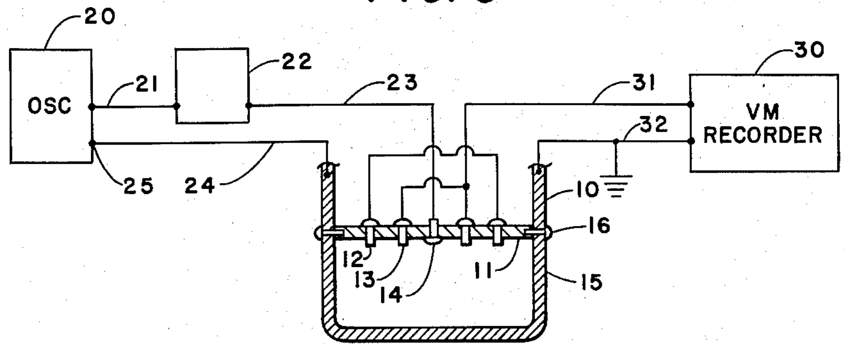
FIGURE 4 is a cross-sectional view which shows a method for connecting the electrodes in a "short" normal arrangement.

FIGURES 2, 3, and 4 show some of the electrical connections possible in the sonde.

Referring to FIGURE 2, the "lateral" arrangement for connecting the electrodes is illustrated. A generator or oscillator 20 is connected to electrode 13 through a current measuring source 22. The return to the oscillator is connected from electrode 12 through a conductor such as 24. The measuring or recording system for the sonde is connected from the center electrode and shell 10 through conductors 31 and 32, respectively, to recorder 30. In operation, a voltage generated by oscillator 20 will create an electrical field between electrodes 12 and 13, the field being confined by electrode 15. The voltage between electrodes 14 and 15 will vary, depending upon the resistivity of the fluid in the well-bore, thus, the voltage being supplied to recorder or voltmeter 30 will fluctuate with a fluctuation at the electrodes 14 and 15. It should be stated that in the "lateral" arrangement, electrode 14 has a relatively high field substantially surrounding the electrode, the field being generated by electrodes 12 and 13. Due to the strength of the field, electrode 14 is well shielded from outside disturbances, such as, for example, the well-bore wall.

FIGURES 2 and 3 disclose the "long" and "short" normal arrangements, respectively. It can be seen in both these figures that the voltage pickup arrangements have been moved to the outer electrodes. In this arrangement, the pickup electrodes are not afforded the protection provided by the "lateral" arrangement disclosed in FIGURE 2. It is to be expected that the "lateral" arrangement will be more acceptable to variation in the position of the sonde and variations in the diameter of the well-bore. However, all the arrangements afforded a much better measure of resistivity than do the prior art devices. However, the "lateral" arrangement as previously stated, is almost free of external environmental variations.

A model according to the above disclosure was constructed and experimentally operated. A glass beaker, 4⅞" in diameter and filled with 6" of brine having .56 ohm meters resistivity was used to stimulate the well-bore and well-bore fluid, respectively. The following table substantiates that the preferred embodiment of the device (the "lateral" arrangement) was substantially unaffected by the position or depth within the stimulated well-bore.

*Positioning Test, "Lateral" Arrangement*

| Tool Depth in Beaker | Position No. (See Figure 3) | Voltage (Millivolts) | Percnet Voltage From Position #1 |
|---|---|---|---|
| Surface | 1 | 1.11 | ---------- |
| | 2 | 1.12 | 0.90 |
| | 3 | 1.12 | 0.90 |
| Middle | 1 | 1.11 | ---------- |
| | 2 | 1.11 | 0.00 |
| | 3 | 1.11 | 0.00 |
| Bottom | 1 | 1.10 | ---------- |
| | 2 | 1.11 | 0.90 |
| | 3 | 1.11 | 0.00 |

Position No. 1 is with the tool centered in the middle of the beaker.
Position No. 2, tool uncentered with the guard parallel with the side of the beaker.
Position No. 3, tool uncentered, guard perpendicular to the side of the beaker.

Since the beaker was made of glass, showing that the borehole wall, in essence, was a complete non-conductor, a test was run with a beaker having a high conductivity. For the test, a steel beaker was selected. The test showed no significant change from the test shown in the above table.

During the actual operation of the equipment within a borehole, the electrical equipment could easily be located in the sonde itself, and power supplied from a cable at the surface of the borehole or by batteries within the sonde. The milliammeter would not necessarily need to be included within the sonde and could be omitted. Provisions could easily be inserted providing for a calibration. The voltmeter 30 disclosed, would during actual use, be an instrument such as a photographic recording means, or other well known form of recording means which would be located at the surface and connected to the sonde by insulated wires in a supporting cable. As previously mentioned, the sonde could be incorporated at the bottom of an existing sonde, or it could be constructed so that it could be connected to or attached in some well known method to an existing sonde. Thus, a device has been disclosed which clearly provides for a method of accurately measuring the resistivity of the fluid within a borehole. The apparatus is completely insensitive to either the position within the borehole or to the variation in width of the borehole, but is sensitive to actual variations in the resistivity of the borehole fluid. It should be obvious to one skilled in the art that the electrodes themselves could be modified in any well known manner, for instance, they could be a plurality of rivets, or for some purposes single rivets could be inserted in place of the plurality of rivets. Conductive rings or partial rings could be employed. It should also be further obvious to one skilled in the art that the generator and voltmeter arrangements can be interchanged without affecting the operation of the device.

Although this invention has been described with respect to particular embodiments thereof, it is not to be so limited, as changes and modifications may be made therein which are within the spirit and scope of the invention as defined by the appended claims.

We claim:

1. An apparatus for measuring the resistivity of the fluid within a generally vertical well bore, the apparatus comprising:
   - an electrically nonconductive plate member;
   - a plurality of electrodes mounted at spaced intervals on the plate member;
   - electrically conductive support means connected to the nonconductive plate member for confining the plate member to a plane substantially perpendicular to the axis of the well bore;
   - electrically conductive confining means having at least one aperture therein for passing fluid into contact with the electrodes mechanically and electrically connected to the support means and extending below the nonconductive plate member for substantially confining electric current to the fluid within the confining means;
   - electrical current generating means operatively connected to a first group of the electrodes; and,
   - electrical current indicating means operatively connected to a second group of the electrodes and to the support means.

2. An apparatus for measuring the resistivity of the fluid within a well bore as defined in claim 1 wherein the electrically conductive confining means comprises a generally U-shaped member attached to the support means at opposite edges of the plate member.

3. An apparatus for measuring the resistivity of the fluid within a well bore as defined in claim 1 further characterized in that the plurality of electrodes comprises a central electrode and a pair of spaced, concentric ring electrodes and wherein said generating means is connected to the ring electrodes and the indicating means is connected between the support means and the center electrode.

References Cited in the file of this patent

UNITED STATES PATENTS

| | | |
|---|---|---|
| 2,082,213 | O'Donnel | June 1, 1937 |
| 2,570,111 | Goble | Oct. 2, 1951 |
| 2,872,638 | Jones | Feb. 3, 1959 |
| 3,004,214 | Wells | Oct. 10, 1961 |